(12) United States Patent
Uehara et al.

(10) Patent No.: US 9,404,375 B2
(45) Date of Patent: Aug. 2, 2016

(54) SHAFT SEAL DEVICE AND ROTARY MACHINE INCLUDING SHAFT SEAL DEVICE

(75) Inventors: Hidekazu Uehara, Tokyo (JP);
Tanehiro Shinohara, Tokyo (JP);
Takashi Nakano, Tokyo (JP); Shin Nishimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/518,559

(22) PCT Filed: Jan. 28, 2011

(86) PCT No.: PCT/JP2011/051757
§ 371 (c)(1),
(2), (4) Date: Jun. 22, 2012

(87) PCT Pub. No.: WO2011/111433
PCT Pub. Date: Sep. 15, 2011

(65) Prior Publication Data
US 2012/0261884 A1    Oct. 18, 2012

(30) Foreign Application Priority Data
Mar. 10, 2010    (JP) .................................. 2010-053657

(51) Int. Cl.
| F01D 11/02 | (2006.01) |
| F01D 11/00 | (2006.01) |
| F16J 15/32 | (2016.01) |

(52) U.S. Cl.
CPC ........... *F01D 11/001* (2013.01); *F16J 15/3292* (2013.01); *F05D 2230/90* (2013.01); *F05D 2240/59* (2013.01)

(58) Field of Classification Search
USPC ............... 277/355, 411, 412, 416; 415/174.2, 415/173.4
See application file for complete search history.

(56) References Cited

U.S. PATENT DOCUMENTS 6,267,381 B1    7/2001    Wright
6,736,597 B2 *  5/2004    Uehara et al. .............. 415/174.2
(Continued)

FOREIGN PATENT DOCUMENTS

| CN | 1278063 | 10/2006 |
| CN | 1946957 | 4/2007 |
(Continued)

OTHER PUBLICATIONS

International Search Report issued Mar. 29, 2011 in International (PCT) Application No. PCT/JP2011/051757 with English translation.
(Continued)

*Primary Examiner* — Kristina Fulton
*Assistant Examiner* — Eugene G Byrd
(74) *Attorney, Agent, or Firm* — Wenderoth, Lind & Ponack, L.L.P.

(57) ABSTRACT

A shaft seal device includes a seal piece-laminated body with a plurality of thin seal pieces laminated in a circumferential direction along a rotating shaft. Outer ends of the plurality of thin seal pieces in the radial direction are connected to each other. Inner ends of the thin seal pieces in the radial direction are formed as free ends. A small gap is formed between each adjacent pair of the thin seal pieces. A small gap is formed between the rotating shaft and the seal piece-laminated body. A wear-resistant treatment layer is formed on a surface of a portion of each of the thin seal pieces close to the inner end.

4 Claims, 8 Drawing Sheets

(56) References Cited

U.S. PATENT DOCUMENTS

| | | | |
|---|---|---|---|
| 6,874,788 B2* | 4/2005 | Kono | 277/355 |
| 7,226,053 B2* | 6/2007 | Nakano et al. | 277/355 |
| 7,261,515 B2* | 8/2007 | Nishimoto et al. | 415/174.2 |
| 7,364,165 B2* | 4/2008 | Nakano et al. | 277/355 |
| 7,419,164 B2* | 9/2008 | Awtar et al. | 277/418 |
| 7,651,101 B2* | 1/2010 | Awtar et al. | 277/412 |
| 7,828,297 B2* | 11/2010 | Hoebel et al. | 277/412 |
| 8,025,296 B2* | 9/2011 | Uehara et al. | 277/412 |
| 8,220,802 B2* | 7/2012 | Rhodes et al. | 277/412 |
| 8,250,756 B2* | 8/2012 | Adis et al. | 29/888.3 |
| 8,262,349 B2* | 9/2012 | Turnquist et al. | 415/173.4 |
| 8,382,120 B2* | 2/2013 | Deo et al. | 277/355 |
| 8,474,827 B2* | 7/2013 | Grondahl et al. | 277/411 |
| 2003/0068224 A1* | 4/2003 | Uehara et al. | 415/170.1 |
| 2004/0256810 A1* | 12/2004 | Nakano et al. | 277/402 |
| 2008/0042365 A1* | 2/2008 | Awtar et al. | 277/411 |
| 2008/0042366 A1* | 2/2008 | Awtar et al. | 277/411 |
| 2008/0131269 A1 | 6/2008 | Deo et al. | |
| 2008/0265514 A1* | 10/2008 | Mortzheim | 277/303 |
| 2008/0272553 A1 | 11/2008 | Awtar et al. | |
| 2010/0143102 A1 | 6/2010 | Deo et al. | |

FOREIGN PATENT DOCUMENTS

| | | |
|---|---|---|
| CN | 1324221 | 7/2007 |
| CN | 101126449 | 2/2008 |
| GB | 2 286 434 | 8/1995 |
| JP | 63-297737 | 12/1988 |
| JP | 11-131257 | 5/1999 |
| JP | 2005-3199 | 1/2005 |
| JP | 3692300 | 9/2005 |
| JP | 3917993 | 5/2007 |
| JP | 2008-45743 | 2/2008 |

OTHER PUBLICATIONS

Written Opinion of the International Searching Authority issued Mar. 29, 2011 in International (PCT) Application No. PCT/JP2011/051757 with English translation.

Chinese Office Action issued Feb. 26, 2014 in corresponding Chinese Patent Application No. 201180005061.1 with English translation.

Decision to Grant a European Patent issued Apr. 1, 2016 in corresponding European Patent Application No. 11753095.6.

* cited by examiner

SHAFT SEAL DEVICE AND ROTARY MACHINE INCLUDING SHAFT SEAL DEVICE

TECHNICAL FIELD

The present invention relates to a shaft seal device and a rotary machine including the shaft seal device. Priority is claimed on Japanese Patent Application No. 2010-053657, filed Mar. 10, 2010, the content of which is incorporated herein by reference.

BACKGROUND ART

As well known, in a shaft seal mechanism of a gas turbine, a steam turbine, a compressor, a waterwheel, a refrigerator, and a pump, a mechanism disclosed in PTL 1 is known as a shaft seal mechanism which seals a rotating shaft, in rotary machines.

FIG. 12 is a perspective view showing the schematic structure of a shaft seal mechanism 100 in the related art.

The shaft seal mechanism 100 includes shaft seal devices 102, which are housed in a housing 101 surrounding a rotating shaft R on a stator side.

The shaft seal device 102 includes a seal piece-laminated body 103 where a plurality of thin seal pieces 103a are laminated in the circumferential direction along the periphery of a rotating shaft R, a high-pressure side seal plate 104 that covers a part of the seal piece-laminated body 103 on a fluid high-pressure side in the axial direction, and a low-pressure side seal plate 105 that covers a part of the seal piece-laminated body 103 on a fluid low-pressure side in the axial direction. In the seal piece-laminated body 103, outer ends of the plurality of thin seal pieces 103a in the radial direction are connected to each other and inner ends of the plurality of thin seal pieces 103a in the radial direction are formed as free ends. Further, in the seal piece-laminated body 103, the outer ends of the thin seal pieces 103a are housed in the housing 101 and the respective thin seal pieces 103a are inclined in a tangential direction and extend from the housing 101 toward a rotating shaft R.

In the shaft seal mechanism 100 having the above configuration, when the rotating shaft R stops, the inner ends of the thin seal pieces 103a come into contact with the rotating shaft R with a predetermined pre-load. However, when the rotating shaft R is rotated, a floating force is applied to the thin seal pieces 103a by a dynamic pressure effect. A small gap is formed between the rotating shaft R and the thin seal pieces 103a by using this floating force, so that working fluid is sealed and the wear of the rotating shaft R and the respective thin seal pieces 103a is prevented.

Further, a gas pressure distribution in a small gap, which is formed at every two thin seal pieces adjacent to each other, is set by adjusting the dimensions of the high-pressure side seal plate and the low-pressure side seal plate in the radial direction. For example, if the low-pressure side seal plate is shorter than the high-pressure side seal plate, a gas pressure distribution in the small gap is set so that gas pressure is gradually reduced toward the outer end from the inner end. Furthermore, it is possible to make pressure act so as to aid the floating force that is generated by the dynamic pressure effect.

CITATION LIST

Patent Document

[Patent Document 1] Japanese Patent No. 3917993

SUMMARY OF INVENTION

Problems to be Solved by the Invention

However, in the related art, since dynamic pressure is relatively small during starting, stop, turning, or the like of a rotary machine, the floating force applied to the thin seal pieces is also reduced. Accordingly, the inner ends of the thin seal pieces come into sliding contact with the rotating shaft. For this reason, there is a possible in that the thin seal pieces are worn out.

The present invention has been made in consideration of the above-mentioned circumstances, and an object of the invention is to provide a shaft seal device that suppresses the wear of thin seal pieces and a rotary machine including the shaft seal device.

Means for Solving the Problem

In order to achieve the above-mentioned object, the invention employs the following means.

That is, a shaft seal device according to the invention is a shaft seal device including a seal piece-laminated body where a plurality of thin seal pieces are laminated in the circumferential direction along the periphery of a rotating shaft, outer ends of the plurality of thin seal pieces in the radial direction are connected to each other, inner ends of the thin seal pieces in the radial direction are formed as free ends, a small gap is formed at every two thin seal pieces adjacent to each other, and a small gap is formed between the rotating shaft and the seal piece-laminated body. Further, a wear-resistant treatment layer is formed on the surface of a portion of the thin seal piece close to the inner end.

That is, the shaft seal device according to the invention is a shaft seal device including a seal piece-laminated body, and the seal piece-laminated body includes a plurality of thin seal pieces that are laminated in the circumferential direction along the periphery of a rotating shaft.

Outer ends of the plurality of thin seal pieces in the radial direction are connected to each other, and inner ends of the thin seal pieces in the radial direction are formed as free ends.

Further, a small gap is formed between two thin seal pieces adjacent to each other, and a small gap is formed between the rotating shaft and the plurality of thin seal pieces. Furthermore, a wear-resistant treatment layer is formed on the surface of a portion of each of the plurality of thin seal pieces close to the inner end.

According to this structure, a wear-resistant treatment layer is formed on the surface of a portion of the thin seal piece close to the inner end. For this reason, when a floating force applied to the thin seal piece is small during starting or the like of the rotary machine or when a floating force applied to the thin seal piece is unexpectedly reduced, the wear-resistant treatment layer slides on the rotating shaft. Accordingly, since the wear-resistant treatment layer reduces wear caused by sliding contact, it is possible to suppress the wear of the thin seal piece.

Moreover, the wear-resistant treatment layer may be a plating treatment layer.

According to this structure, since the wear-resistant treatment layer is a plating treatment layer, the thickness of a portion of the thin seal piece on which the wear-resistant treatment layer is formed is increased by the thickness of the plating treatment layer. Accordingly, it is possible to reduce at least a part of the small gap that is formed between the thin seal pieces adjacent to each other. Therefore, since at least a part of the small gap is further reduced, a working fluid does not easily flow through the small gap. As a result, it is possible to improve sealability.

Further, the seal piece-laminated body may include two small side surfaces that are formed by collecting a plurality of both side end portions, which correspond to the width direction, of the thin seal pieces close to the inner ends, respectively. Furthermore, the seal piece-laminated body includes a high-pressure side seal plate which covers an outer side of the small side surface in the radial direction, of the small side surfaces corresponding to a fluid high-pressure side in the axial direction and from which an inner side of the small side surface in the radial direction is exposed; and a low-pressure side seal plate which covers an inner side of the small side surface in the radial direction, of the small side surfaces corresponding to a fluid low-pressure side in the axial direction and from which an inner side of the small side surface in the radial direction, which is larger than the portion exposed from the high-pressure side seal plate, is exposed. Moreover, the wear-resistant treatment layer is formed from the inner end up to a position which overlaps the high-pressure side seal plate when seen in the axial direction.

According to this structure, the wear-resistant treatment layer is formed from the inner end up to a position which overlaps the high-pressure side seal plate when seen in the axial direction. For this reason, it is possible to reduce the small gap of the position corresponding to the portion of the small side surface that is exposed from the high-pressure side seal plate. Accordingly, since a portion of the small gap through which the working fluid flows into the small gap is further narrowed, the working fluid does not easily flow into the small gap. As a result, it is possible to further improve sealability.

Further, the wear-resistant treatment layer is formed so as to be included in a range exposed from the low-pressure side seal plate when seen in the axial direction.

According to this structure, the wear-resistant treatment layer is formed so as to be included in a range exposed from the low-pressure side seal plate when seen in the axial direction. Accordingly, the plating treatment layer is not formed on the outer side of the thin seal piece in the radial direction, so that the change of the rigidity of the thin seal piece is minimized. Therefore, it is possible to simultaneously maintain the good elasticity of the thin seal piece and to improve the sealability of the thin seal piece.

Furthermore, the wear-resistant treatment layer may be a diffusion coating layer.

According to this structure, since the wear-resistant treatment layer is a diffusion coating layer, it is possible to improve wear resistance without changing the size of the small gap.

Moreover, the seal piece-laminated body includes two small side surfaces that are formed by collecting a plurality of both side end portions, which correspond to the width direction, of the thin seal pieces close to the inner ends, respectively. Further, the seal piece-laminated body includes a high-pressure side seal plate which covers an outer side of the small side surface in the radial direction, of the small side surfaces corresponding to a fluid high-pressure side in the axial direction and from which an inner side of the small side surface in the radial direction is exposed; and a low-pressure side seal plate which covers an inner side of the small side surface in the radial direction, of the small side surfaces corresponding to a fluid low-pressure side in the axial direction and from which an inner side of the small side surface in the radial direction, which is larger than the portion exposed from the high-pressure side seal plate, is exposed. Furthermore, the wear-resistant treatment layer is formed from the inner end up to a position which overlaps the high-pressure side seal plate when seen in the axial direction, and is formed so as to be included in a range exposed from the low-pressure side seal plate when seen in the axial direction.

According to this structure, the wear-resistant treatment layer is formed from the inner end up to a position which overlaps the high-pressure side seal plate when seen in the axial direction, and is formed so as to be included in a range exposed from the low-pressure side seal plate when seen in the axial direction. For this reason, the wear-resistant treatment layer is not formed on the outer side of the thin seal piece in the radial direction, so that the change of the rigidity of the thin seal piece is minimized. Accordingly, it is possible to maintain the good elasticity of the thin seal piece.

Moreover, a rotary machine according to the invention includes any shaft seal devices of the above-mentioned shaft seal devices around the rotating shaft.

According to this structure, a rotary machine according to the invention includes any shaft seal devices of the above-mentioned shaft seal devices. Accordingly, the wear of the thin seal pieces is suppressed, so that seal performance is maintained. Therefore, a rotary machine is obtained which has a long life and has excellent maintainability.

Effects of the Invention

According to the shaft seal device of the invention, it is possible to suppress the wear of a thin seal piece.

According to the rotary machine including the shaft seal devices of the invention, a rotary machine, which has a long life and has excellent maintainability, is obtained.

Figure 11:
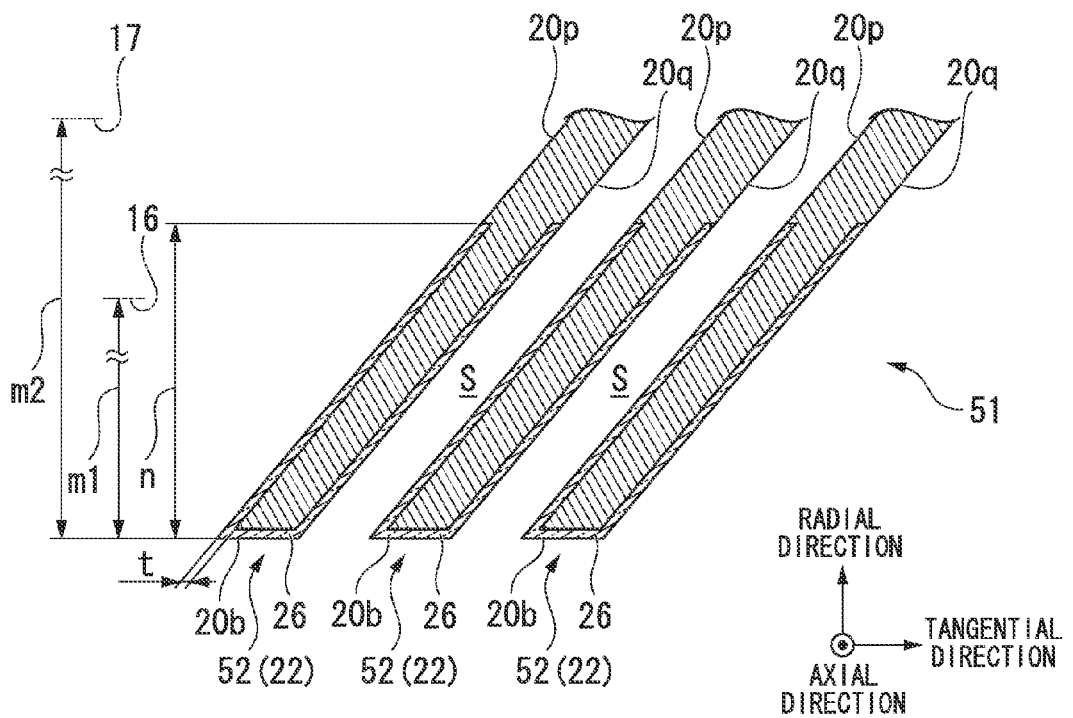

FIG. 11 is a developed cross-sectional view in which thin seal pieces 52 of a seal segment 51 according to a second embodiment of the invention are developed in the circumferential direction and which shows the cross-section perpendicular to an axial direction.

Figure 12:
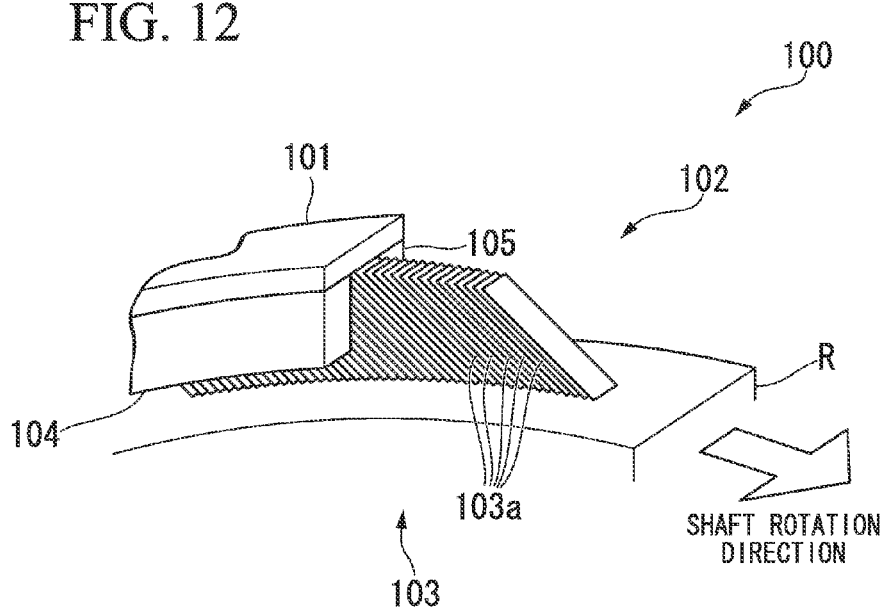

FIG. 12 is a perspective view showing the schematic structure of a shaft seal mechanism 100 in the related art.

EMBODIMENTS OF THE INVENTION

Embodiments of the invention will be described below with reference to the drawings.

First Embodiment (Entire Structure of Gas Turbine)

Figure 1:
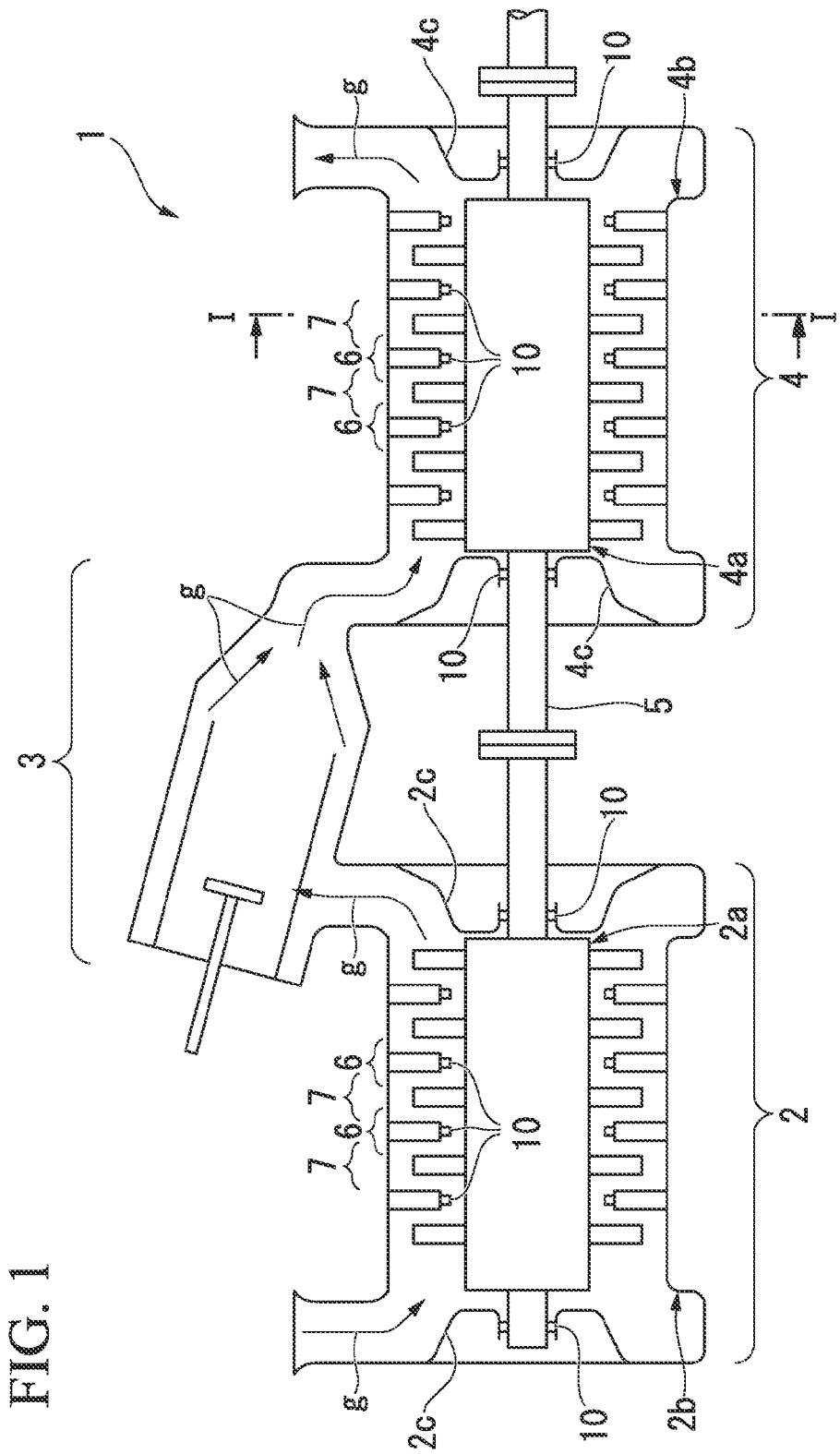
FIG. 1 is a schematic view showing the entire structure of a gas turbine 1 according to a first embodiment of the invention.
Figure 2:
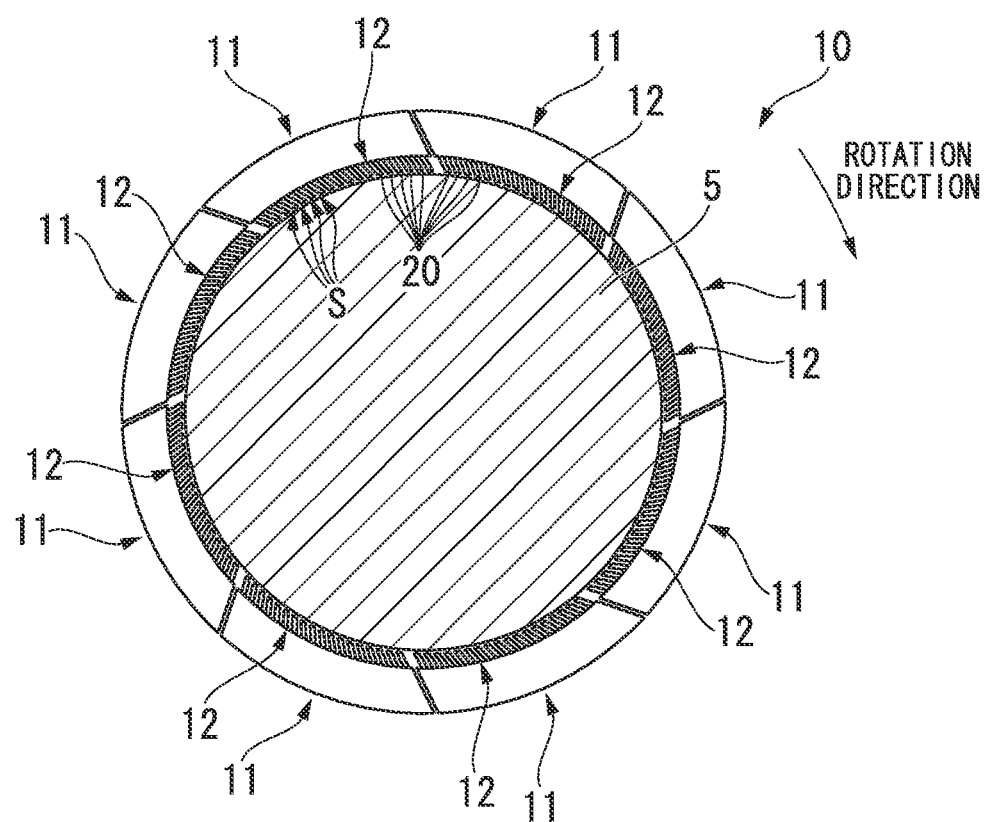
FIG. 2 is a cross-sectional view taken along a line I-I of FIG. 1.

FIG. 1 is a schematic view showing the entire structure of a gas turbine (rotary machine) 1 according to a first embodiment of the invention, and FIG. 2 is a cross-sectional view taken along a line I-I of FIG. 1.

As shown in FIG. 1, the gas turbine 1 includes a compressor (rotary machine) 2 that takes a large amount of air thereinto and compresses the air, a combustor 3 that mixes fuel into the compressed air compressed by the compressor 2 and combusts the mixture, and a turbine (rotary machine) 4 that converts the thermal energy of combustion gas introduced from the combustor 3 into rotational energy. Further, a rotor 2a of the compressor 2 and a rotor 4a of the turbine 4 are connected to each other, so that a rotating shaft 5 is formed.

As shown in FIG. 1, annular stator blade groups 6 where a plurality of stator blades are fixed annularly to the respective inner peripheral portions of a compressor casing 2b and a turbine casing 4b at intervals in the circumferential direction and annular rotor blade groups 7 where a plurality of rotor blades are fixed annularly to the outer peripheral portion of the rotating shaft 5 at intervals in the circumferential direction are alternately arranged in the compressor 2 and the turbine 4 in the axial direction of the rotating shaft 5.

In this gas turbine 1, shaft seal mechanisms 10 are provided on the inner peripheral portions of the respective annular stator blade groups 6 in order to prevent the working fluid (compressed air or combustion gas) g from leaking to the low-pressure side from the high-pressure side in the axial direction.

Further, shaft seal mechanisms 10 are provided at bearing portions 2c where the compressor casing 2b supports the rotating shaft 5 and at bearing portions 4c where the turbine casing 4b supports the rotating shaft 5, in order to prevent the working fluid g from leaking to the low-pressure side from the high-pressure side.

As shown in FIG. 2, in each of the shaft seal mechanisms 10, a plurality of (eight in the first embodiment) seal segments (shaft seal devices) 11, which extend in an arc shape, are disposed in annularly in the circumferential direction around the rotating shaft 5.

(Structure of Seal Segment)

Figure 3:
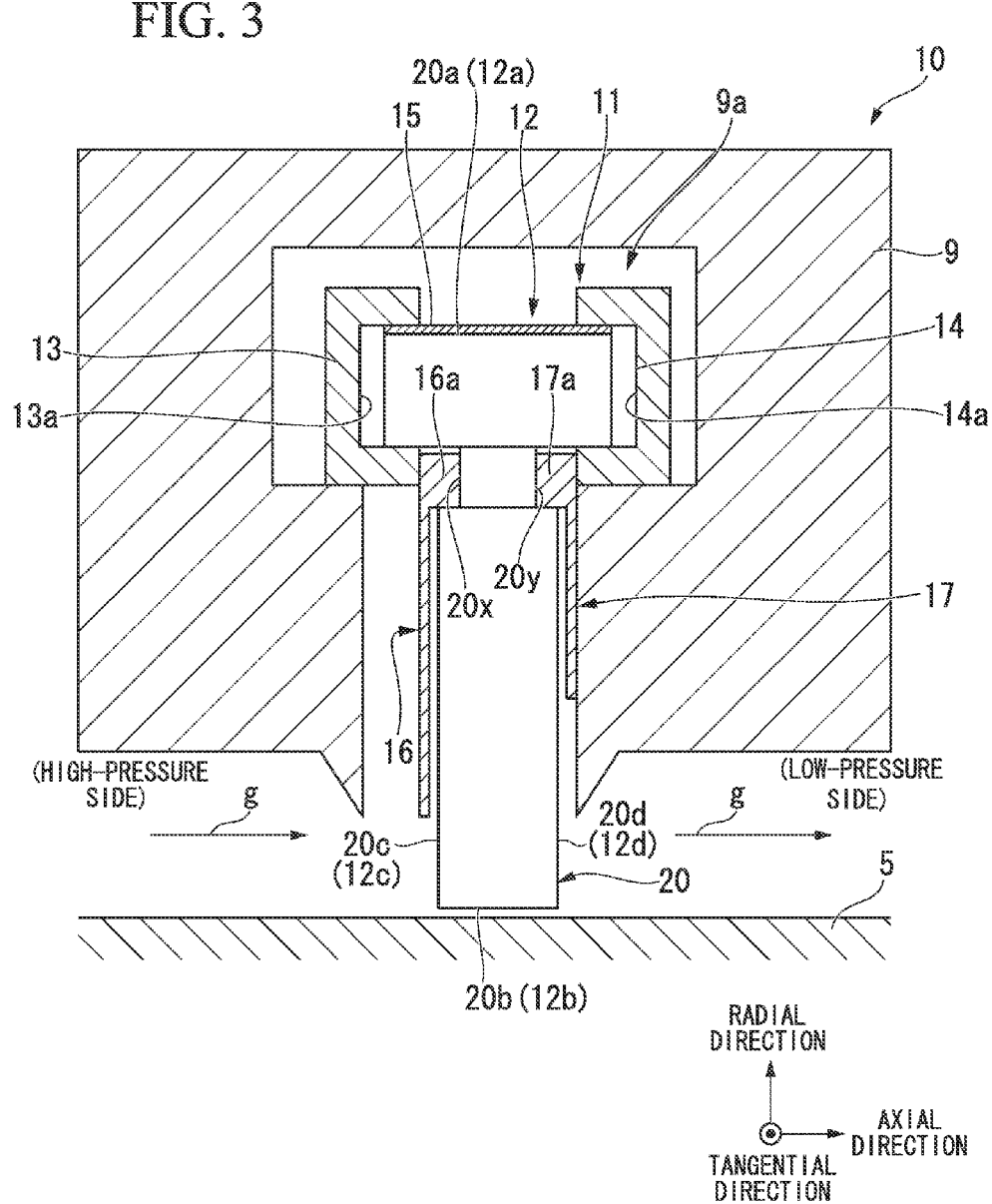
FIG. 3 is a cross-sectional view showing the schematic structure of a shaft seal mechanism 10 according to the first embodiment of the invention and shows the cross-section taken along an axis of a rotating shaft 5.
Figure 4:
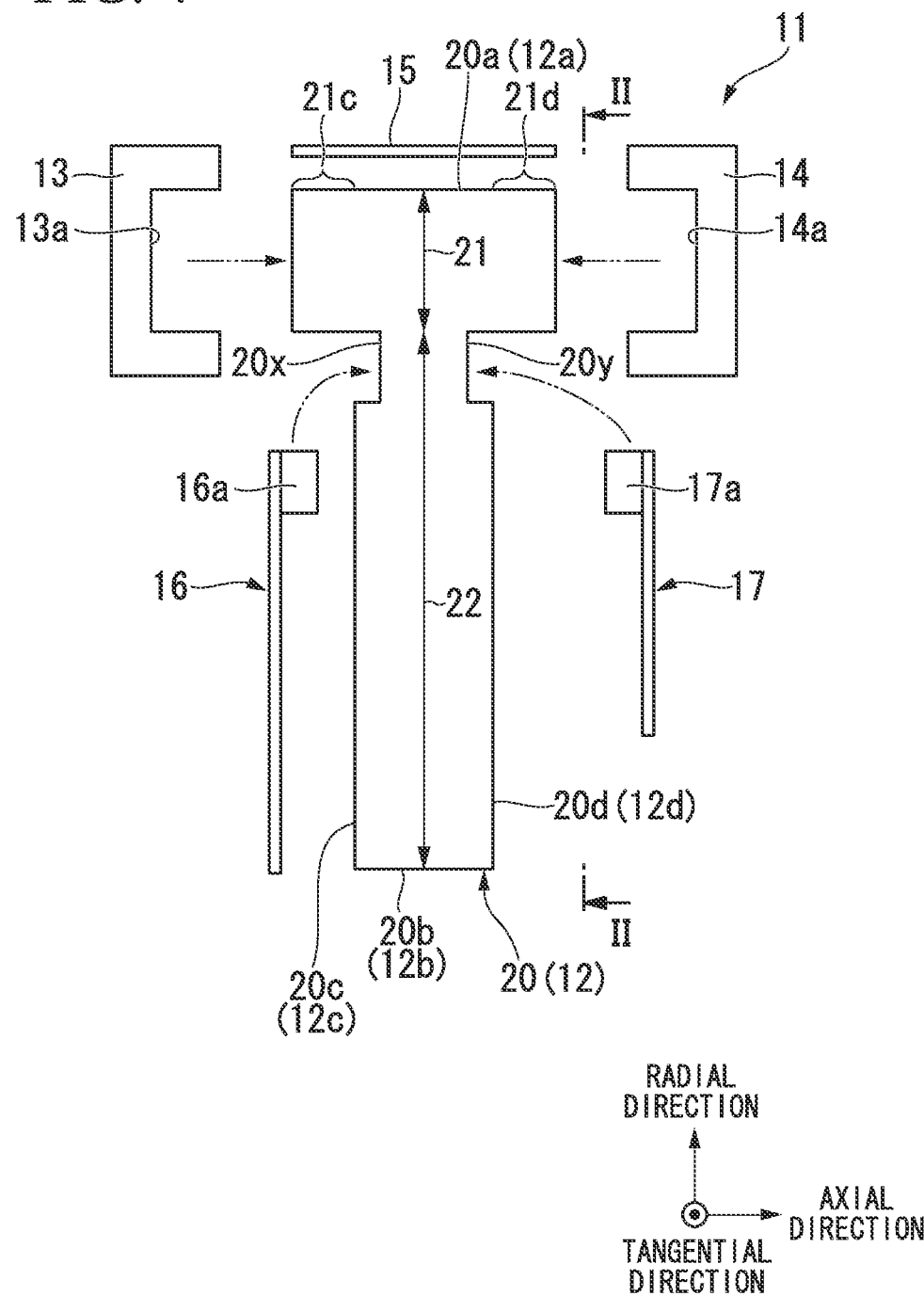
FIG. 4 is an exploded view of a seal segment 11 according to the first embodiment of the invention.
Figure 5:
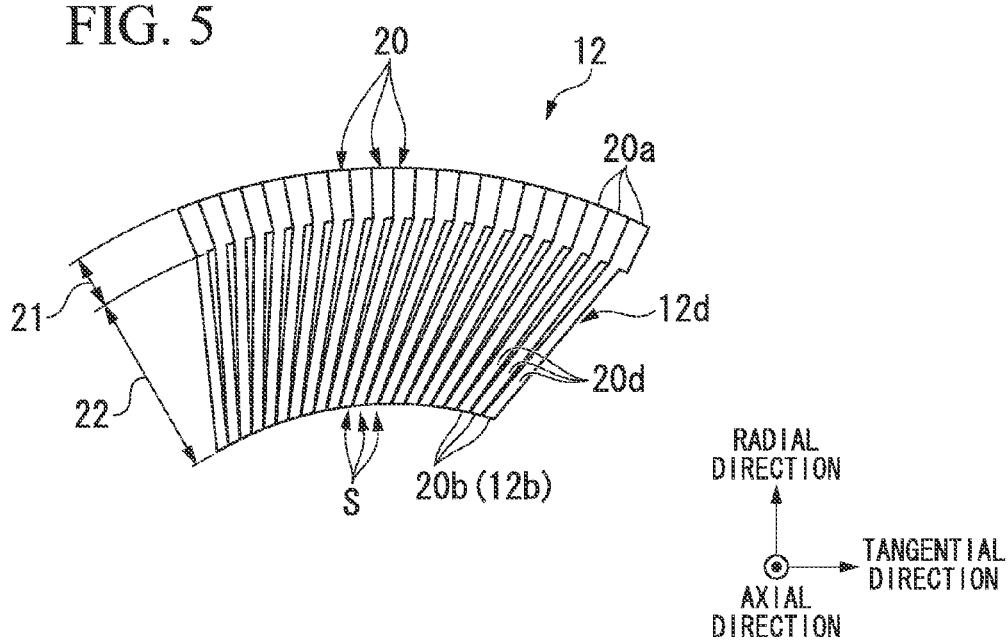
FIG. 5 is an enlarged view of main portions of a seal piece-laminated body 12 according to the first embodiment of the invention, and is a view taken along a line II-II of FIG. 4.

FIG. 3 is a cross-sectional view showing the schematic structure of the shaft seal mechanism 10 in the cross-section taken along an axis of the rotating shaft 5. FIG. 4 is an exploded view of the schematic structure of the seal segment 11. FIG. 5 is an arrow view taken along a line II-II of FIG. 4.

As shown in FIG. 3, the respective seal segments 11 are inserted into housings (which corresponds to the annular stator blade groups 6 and the bearing portions 2c and 4c) 9.

As shown in FIG. 3, the seal segment 11 includes a seal piece-laminated body 12 (see FIG. 5) where a plurality of thin seal pieces 20 are laminated, retaining rings 13 and 14 that have a U-shaped cross-section, a back spacer 15, a high-pressure side seal plate 16, and a low-pressure side seal plate 17.

As shown in FIG. 5, the seal piece-laminated body 12 is a member where the plurality of thin seal pieces 20 having the shape of a thin plate are laminated (see FIG. 2) and outer ends 20a of the plurality of thin seal pieces 20 in the radial direction are connected to each other.

As shown in FIG. 3, the thin seal piece 20 is a member that is mainly formed of a thin steel plate. Further, the thin seal piece 20 is formed in a T shape when seen in the tangential direction of the rotating shaft 5, and the width direction of the thin seal piece 20 is parallel to the axial direction of the rotating shaft 5. As shown in FIG. 4, the thin seal piece 20 includes a head portion 21 that is close to the outer end 20a, and a body portion 22 that is formed so as to have a width and thickness (see FIG. 5) smaller than the width and thickness of the head portion 21 and extends from the middle of the head portion 21 in the axial direction at an inner edge of the head portion 21 in the radial direction.

As shown in FIG. 4, cutout portions 20x and 20y are formed at a boundary portion of the thin seal piece 20 between the head portion 21 and the body portion 22 (at the outer portion in the radial direction).

Side protruding portions 21c of the respective head portions 21 are welded in the respective thin seal pieces 20, and the respective thin seal pieces 20 are connected to each other. Meanwhile, the body portion 22 of each of the thin seal pieces 20 can be elastically deformed, and an inner end 20b of each of the thin seal pieces 20 is formed as a free end.

In the thin seal piece 20, the thickness of the head portion 21 is larger than the thickness of the body portion 22 as shown in FIG. 5. For this reason, when the thin seal pieces 20 are laminated, a small gap s is formed between the body portions 22 of every two thin seal pieces 20 adjacent to each other.

The seal piece-laminated body 12 where the plurality of thin seal pieces 20 are laminated is inserted into the housing 9 so that a small side surface 12c formed by collecting a plurality of side end portions 20c of the body portions 22 of the respective thin seal pieces 20 faces the high-pressure side and a small side surface 12d formed by collecting a plurality of side end portions 20d of the body portions 22 of the respective thin seal pieces 20 faces the low-pressure side. A portion of each of the thin seal pieces 20 close to the inner end 20b of the seal piece-laminated body 12 come into contact with the rotating shaft 5 with a predetermined precompression at the time of the stop of the rotating shaft 5.

Figure 6:
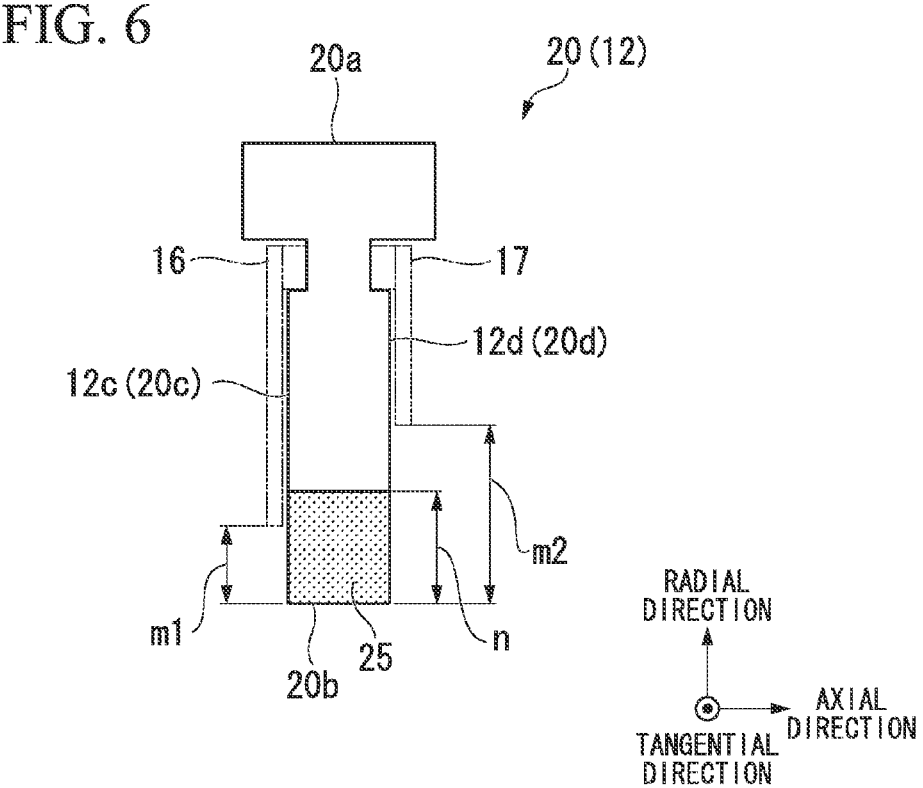
FIG. 6 is an enlarged view of main portions of a thin seal piece 20 according to the first embodiment of the invention.
Figure 7:
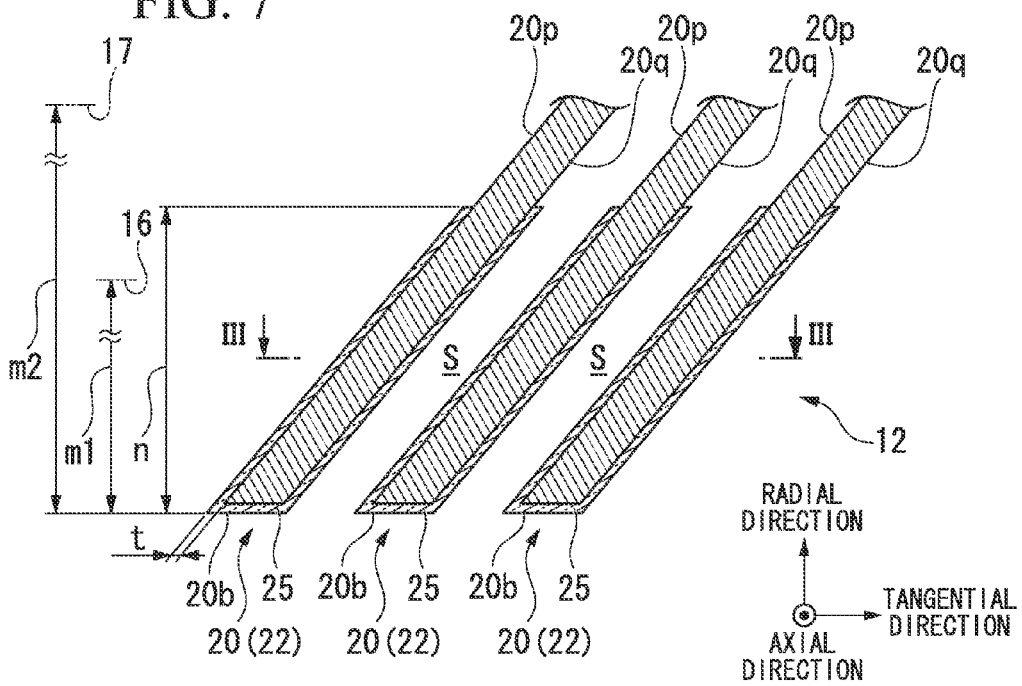
FIG. 7 is a developed cross-sectional view in which the thin seal piece 20 according to the first embodiment of the invention are developed in the circumferential direction and which shows the cross-section perpendicular to an axial direction.

FIG. 6 is an enlarged view of main portions of the thin seal piece 20. Further, FIG. 7 is a developed cross-sectional view in which the thin seal pieces 11 of the thin seal pieces 20 are developed in the circumferential direction and which shows the cross-section perpendicular to the axial direction. Furthermore, FIG. 8 is a cross-sectional view taken along a line III-III of FIG. 7.

Figure 8:
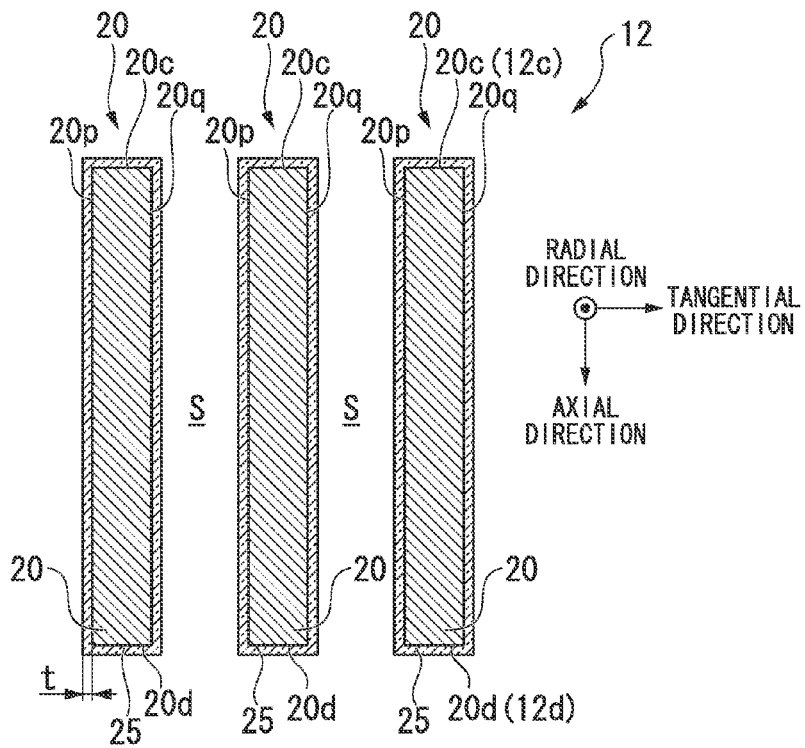
FIG. 8 is a cross-sectional view of main portions of the seal segment 11 according to the first embodiment of the invention and is a cross-sectional view taken along a line III-III of FIG. 7.

As shown in FIGS. 6 to 8, a plating treatment layer (wear-resistant treatment layer) 25 is formed on the surface of a portion of each of the thin seal pieces 20 close to the inner end 20b.

The plating treatment layer 25 is formed by chromium plating and contains molybdenum dioxide ($MoS_2$) as a solid lubricant component. For this reason, the plating treatment layer 25 has improved hardness as compared to a base material (steel) of the thin seal piece 20, and has a low coefficient of friction against the rotating shaft 5 (steel).

As shown in FIGS. 7 and 8, a film thickness t of the plating treatment layer 25 is formed in a μm level. Further, the plating treatment layer 25 causes the small gap s, which is formed between the body portions 22 of the thin seal pieces 20 adjacent to each other, to be reduced by the double (t×2) of the film thickness t of the plating treatment layer.

As shown in FIG. 8, the plating treatment layer 25 is formed over the entire circumference of the cross-section of the thin seal piece 20 perpendicular to the axial direction. Specifically, the plating treatment layer 25 is formed on a lower surface 20q that faces the rotating shaft 5, an upper surface 20p that is the back surface of the lower surface 20q, and the side end portions 20c and 20d.

The plating treatment layer 25 is formed from the inner end 20b of the thin seal piece 20 up to a position, which overlaps the high-pressure side seal plate 16, when seen in the axial direction. In other words, as shown in FIGS. 6 and 7, a dimension n of the plating treatment layer 25 in the radial direction is larger than a dimension m1 of a portion of the small side surface 12d, which is exposed from the high-pressure side seal plate 16, (to be described below in detail) in the radial direction.

Further, the plating treatment layer 25 is formed so as to be included in the range of the small side surface 12d that is exposed from the low-pressure side seal plate 17. In other words, as shown in FIGS. 6 and 7, a dimension n of the plating treatment layer 25 in the radial direction is smaller than a dimension m2 of a portion of the small side surface 12d, which is exposed from the low-pressure side seal plate 17, (to be described below in detail) in the radial direction.

The high-pressure side seal plate 16 is a plate-like member that has the shape of a fan when seen in the axial direction of the rotating shaft 5. Moreover, as shown in FIG. 3, the high-pressure side seal plate 16 covers a part of the seal piece-laminated body 12 on the high-pressure side in the axial direction of the rotating shaft 5. As shown in FIGS. 3 and 4, the high-pressure side seal plate 16 is interposed between the seal piece-laminated body 12 and the retaining ring 13 so that a stepped portion 16a, which is formed at the outer portion in the radial direction so as to have a large width (in the axial direction of the rotating shaft 5), is fitted to the cutout portion 20x of the thin seal piece 20.

Due to this structure, as shown in FIG. 6, the high-pressure side seal plate 16 covers the outer side of the small side surface 12c in the radial direction, and the inner side of the small side surface 12c in the radial direction, which corresponds to the dimension m1 in the radial direction, is exposed to the outside.

The low-pressure side seal plate 17 is a plate-like member that has the shape of a fan when seen in the axial direction of the rotating shaft 5. Moreover, as shown in FIG. 3, the low-pressure side seal plate 17 covers a part of the seal piece-laminated body 12 on the high-pressure side in the axial direction of the rotating shaft 5. The low-pressure side seal plate 17 is interposed between the seal piece-laminated body 12 and the retaining ring 14 so that a stepped portion 17a, which is formed at the outer portion in the radial direction so as to have a large width (in the axial direction of the rotating shaft 5), is fitted to the cutout portion 20y of the thin seal piece 20.

Due to this structure, as shown in FIG. 6, the low-pressure side seal plate 17 covers the outer side of the small side surface 12d in the radial direction, and the inner side of the small side surface 12d in the radial direction, which corresponds to the dimension m2 larger than the dimension of the high-pressure side seal plate 16 in the radial direction, is exposed to the outside.

That is, the high-pressure side seal plate 16 and the low-pressure side seal plate 17 are formed so that the dimension of the low-pressure side seal plate 17 in the radial direction of the rotating shaft 5 is smaller than that of the high-pressure side seal plate 16 in the radial direction of the rotating shaft 5. Further, the high-pressure side seal plate 16 and the low-pressure side seal plate 17 are designed so that the small gap s to be described below has a predetermined gas pressure distribution.

The retaining rings 13 and 14 are arc-shaped members that have a U-shaped cross-section and extend in the circumferential direction of the rotating shaft 5.

As shown in FIGS. 3 and 4, a recessed groove 13a is formed on the surface of the retaining ring 13 facing the side protruding portions 21c of the head portions 21 of the plurality of thin seal pieces 20.

As shown in FIGS. 3 and 4, a recessed groove 14a is formed on the surface of the retaining ring 14 facing the side protruding portions 21d of the head portions 21 of the plurality of thin seal pieces 20.

The back spacer 15 is disposed between the head portion 21 of the thin seal piece 20 and the retaining rings 13 and 14.

The head portions 21 of the respective thin seal pieces 20 of the seal piece-laminated body 12 are fitted to the recessed grooves 13a and 14a of the retaining rings 13 and 14 together with the back spacer 15 as shown in FIG. 3, so that the retaining rings 13 and 14 retain the seal piece-laminated body 12.

As shown in FIG. 3, the seal segment 11 is housed in a T-shaped annular groove 9a that is formed on the inner peripheral portion of the housing 9 so as to have a T-shaped cross-section and extends in the circumferential direction of the rotating shaft 5. Specifically, the retaining rings 13 and 14 are housed in a portion of the T-shaped annular groove 9a, which is formed close to the outer peripheral portion of the T-shaped annular groove 9a in the radial direction so as to have a large width of the groove (in the axial direction of the rotating shaft 5). Further, the high-pressure side seal plate 16, the low-pressure side seal plate 17, and the body portions 22 of the thin seal pieces 20 are housed in a portion of the T-shaped annular groove 9a, which is formed close to the inner peripheral portion of the annular groove in the radial direction so as to have a small shaft of the groove. Furthermore, ends (inner ends 20b) of the body portions 22 protrude from an opening of the T-shaped annular groove 9a toward the rotating shaft 5.

(Operation of Seal Segment)

Figure 9:
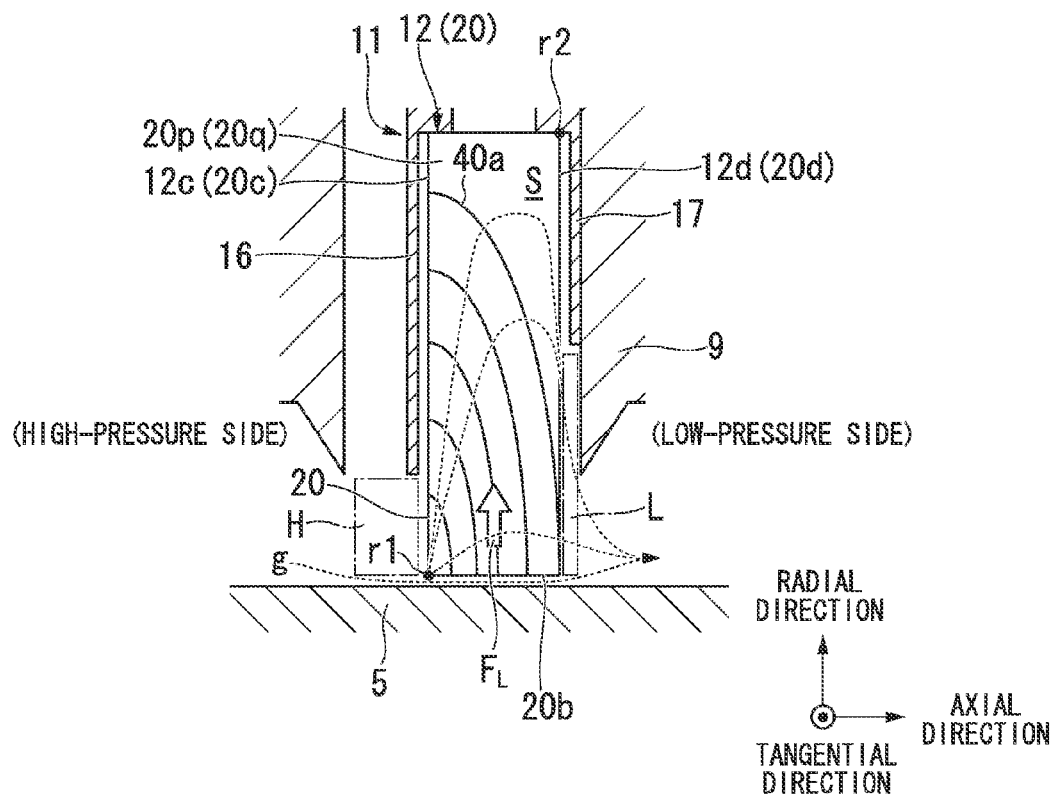
FIG. 9 is a view showing a gas pressure distribution of a working fluid g that is formed in a small gap s of the seal segment 11 according to the first embodiment of the invention.
Figure 10:
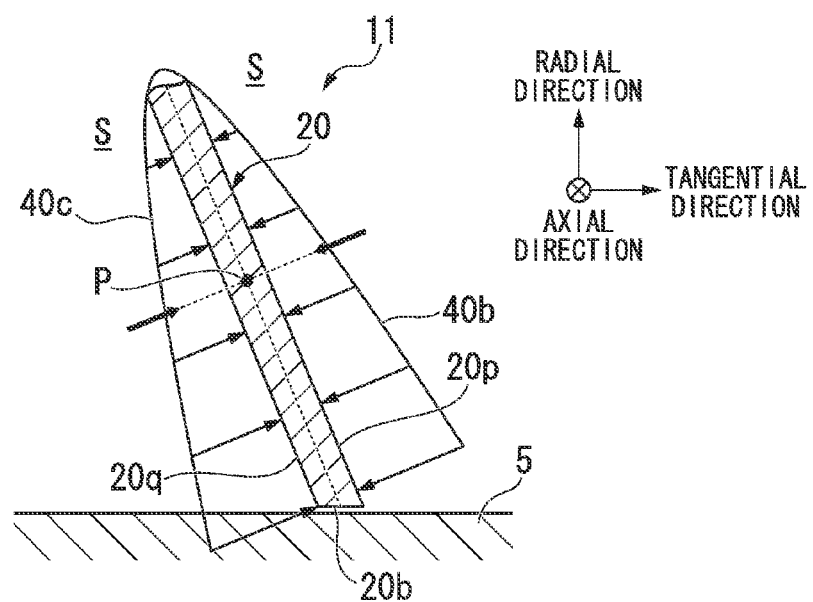
FIG. 10 is a cross-sectional view of main portions of a body portion 22 of the thin seal piece 20 of the seal segment 11 according to the first embodiment of the invention and is a view which shows the cut surface of the body portion 22 perpendicular to the axial direction of the rotating shaft 5 and in which pressure applied to the body portion 22 is represented by vectors.

Subsequently, the operation of the seal segment 11, which is manufactured as described above, will be described. FIG. 9 is a view showing the gas pressure distribution of the working fluid g that is formed in a small gap s. Moreover, FIG. 10 is a view which shows the cut surface of the body portion 22 perpendicular to the axial direction of the rotating shaft 5 and in which pressure applied to the body portion 22 is represented by vectors.

When the gas turbine 1 having stopped is started, the rotating shaft 5 is rotated. Further, the thin seal pieces 20 close to the inner end 20b 20, which come into contact with the rotating shaft 5 with a predetermined pressure, are slidably rubbed on the rotating shaft 5.

In this case, the plating treatment layer 25 is formed on the surface of the inner end 20b of the thin seal piece 20. For this reason, the plating treatment layer 25 is slidably rubbed on the rotating shaft 5. The plating treatment layer 25 has a relatively high hardness, and has a low coefficient of friction against the rotating shaft 5. For this reason, the amount of wear of the plating treatment layer 25 is relatively small.

In addition, the plating treatment layer 25 contains molybdenum dioxide ($MoS_2$) as a solid lubricant component. For this reason, the coefficient of friction of the plating treatment layer 25 against the rotating shaft 5 is further low, so that the amount of wear of the thin seal piece 20 is very small.

Meanwhile, since a coefficient of friction against the rotating shaft 5 is low, the amount of wear of the rotating shaft 5 is also very small.

In this way, the rotation speed of the rotating shaft 5 is increased while the plating treatment layer 25 is slidably rubbed on the rotating shaft 5. Further, when the gas turbine 1 reaches a predetermined rotation speed, a gap is formed between the rotating shaft 5 and the plating treatment layer 25 by the dynamic pressure effect of the rotating shaft 5. Accordingly, frictional sliding disappears. In this state, as shown in FIG. 9, a high-pressure side area and a low-pressure side area of the working fluid g are formed on both sides of the shaft seal mechanism 10 serving as a boundary.

When the high-pressure side area and the low-pressure side area are formed, the seal segment 11 receives pressure from the high-pressure side area toward the low-pressure side area. Further, the low-pressure side seal plate 17 comes into close contact with the housing 9.

Furthermore, as shown in FIG. 9, the working fluid g flows between the outer peripheral surface of the rotating shaft 5 and the inner ends 20b of the thin seal pieces 20.

Moreover, the working fluid g flows into the respective small gaps s from the portion of the small side surface 12c that is exposed from the high-pressure side seal plate 16. In this case, as shown in FIGS. 6 and 7, the plating treatment layer 25 is formed from the inner end 20b of the thin seal piece 20 up to a position, which overlaps the high-pressure side seal plate 16, when seen in the axial direction. For this reason, each of the small gaps s is reduced by the double of the thickness t (t×2) of the plating treatment layer 25. Accordingly, the working fluid g does not easily flow into the small gap s.

As shown in FIG. 9, the working fluid g flowing into the small gap s flows radially from a corner r1 toward a corner r2 along the upper and lower surfaces 20p and 20q that face each other with the small gap s interposed therebetween.

That is, since the dimension of the low-pressure side seal plate 17 in the radial direction is larger than the dimension of the high-pressure side seal plate 16 in the radial direction, a gas pressure distribution 40a, where gas pressure is highest at the corner r1 positioned on the high-pressure side and the inner end 20b of the thin seal piece 20 and gas pressure is gradually reduced toward the diagonal corner r2 as shown in FIG. 9, is formed.

As shown in FIG. 9, a low-pressure area is widened toward the outer end 20a of the thin seal piece 20 in the gas pressure distribution 40a. For this reason, gas pressure distributions 40b and 40c applied to the upper and lower surfaces 20p and 20q of each thin seal piece 20 form a triangular distribution where gas pressure is increased toward the inner end 20b of the thin seal piece 20 and reduced toward the outer end 20a as shown in FIG. 10.

As shown in FIG. 10, the gas pressure distributions 40b and 40c of the upper and lower surfaces 20p and 20q have substantially the same shape. However, since each of the thin seal pieces 20 is disposed so as to be inclined in the tangential direction of the outer periphery of the rotating shaft 5, the relative positions of the gas pressure distributions 40b and 40c of the upper and lower surfaces 20p and 20q deviate from each other. Accordingly, a difference between the gas pressures of the upper and lower surfaces 20p and 20q is generated at an arbitrary point P between the inner end 20b and the outer end 20a of the thin seal piece 20, so that the gas pressure applied to the lower surface 20q becomes higher than the gas pressure applied to the upper surface 20p. Therefore, a floating force FL is generated in a direction where the inner end 20b of the thin seal piece 20 is made to float from the rotating shaft 5.

The floating force FL is applied to the thin seal piece 20 as described above. Further, the floating force FL aids a floating force generated by a dynamic pressure effect, so that a seal clearance is formed between the rotating shaft 5 and the thin seal piece.

Even though the floating force applied to the thin seal pieces 20 becomes insufficient at the time of the stop of the gas turbine 1, at the time of the turning of the gas turbine 1, or in the case of unexpected situations, or the like and the thin seal pieces 20 come into sliding contact with the rotating shaft 5, the amount of wear of the thin seal pieces 20 close to the inner end 20b become very small by the same operation as the operation at the time of the above-mentioned start. For this reason, the seal performance of each of the seal segments 11 is maintained.

As described above, according to the seal segment 11 of the first embodiment, the plating treatment layer 25 is formed on the surface of the thin seal piece 20 close to the inner end 20b. For this reason, when a floating force applied to the thin seal piece 20 is small during starting or the like of the gas turbine 1 or when a floating force applied to the thin seal piece 20 is unexpectedly reduced, the plating treatment layer 25 slides on the rotating shaft 5. Accordingly, the plating treatment layer 25 reduces wear, which is caused by sliding contact.

In addition, the plating treatment layer 25 contains molybdenum dioxide ($MoS_2$) as a solid lubricant component. For this reason, the coefficient of friction between the plating treatment layer 25 and the rotating shaft 5 is further reduced, so that the amount of wear of the thin seal piece 20 becomes very small.

Accordingly, it is possible to suppress the wear of the thin seal piece 20.

Further, the thickness of a portion of the thin seal piece 20, on which the plating treatment layer 25 is formed, is increased by the thickness of the plating treatment layer 25. Accordingly, at least a part of the small gap s, which is formed between the body portions 22 of the thin seal pieces 20 adjacent to each other, is narrowed. Therefore, since the small gap s is further narrowed, the working fluid g does not easily flow through the small gap s. As a result, sealability is improved.

Furthermore, the plating treatment layer 25 is formed from the inner end 20b of the thin seal piece 20 up to a position, which overlaps the high-pressure side seal plate 16, when seen in the axial direction. For this reason, it is possible to narrow the small gap s of the position corresponding to the portion of the small side surface 12c that is exposed from the high-pressure side seal plate 16. Accordingly, since a portion of the small gap s into which the working fluid g flows is further narrowed, the working fluid g does not easily flow into the small gap s. As a result, sealability is further improved.

Moreover, the plating treatment layer 25 is formed so as to be included in the range that is exposed from the low-pressure side seal plate 17 when seen in the axial direction. For this reason, the plating treatment layer 25 is not formed on the outer side of the thin seal piece in the radial direction, so that the change of the rigidity of the thin seal piece 20 becomes requisite minimum. Accordingly, the good elasticity of the thin seal piece 20 is maintained and the sealability of the thin seal piece is improved.

Further, the gas turbine 1 includes the seal segments 11. For this reason, the wear of the thin seal pieces 20 is suppressed, so that the seal performance of the thin seal pieces is maintained. Accordingly, a gas turbine is obtained which has a long life and has excellent maintainability.

Meanwhile, in the above-mentioned structure, the plating treatment layer 25 is formed by chromium plating. However, as long as at least one effect of the improvement of the hardness of the thin seal piece 20 and the reduction of a coefficient of friction against the rotating shaft 5 is obtained, the plating treatment layer may be formed by other methods.

For example, the plating treatment layer may be formed by nickel plating or noble metal plating, or may be made of an alloy thereof or the like.

Further, hard fine particles ("silicon carbide (SiC)", "tungsten carbide (WC)", or "diamond") and self-lubricating fine particles ("PTFE (fluoropolymer)", "graphite", and "boron nitride (BN)") may be codeposited.

Meanwhile, various plating methods may be used as a plating method.

Second Embodiment

A seal segment (shaft seal device) 51 according to a second embodiment of the invention will be described below.

FIG. 11 is a developed cross-sectional view in which thin seal pieces 52 of a seal segment 51 according to a second embodiment of the invention are developed in the circumferential direction and which shows the cross-section perpendicular to an axial direction.

The seal segment 51 is a member that has substantially the same structure as the structure of the seal segment 11, but is different from the seal segment 11 in that thin seal pieces 52 are used instead of the thin seal pieces 20. Further, the thin seal piece 52 is a member that has substantially the same structure as the structure of the thin seal piece 20, but is different from the thin seal piece 20 in that a diffusion coating layer (wear-resistant treatment layer) 26 is formed instead of the plating treatment layer 25 at a portion of the thin seal piece close to the inner end 20b.

Meanwhile, the same elements as the element of the abovementioned first embodiment will be denoted by the same reference numerals and the description thereof will be omitted.

The diffusion coating layer 26 is formed by a nitriding treatment, and the hardness of the diffusion coating layer is improved as compared to the hardness of the thin seal piece 20.

Nitrogen elements penetrate into the thin seal piece 20, so that the diffusion coating layer 26 is formed as shown in FIG. 11. For this reason, unlike the plating treatment layer 25, the diffusion coating layer 26 does not change the thickness of the thin seal piece 20 and narrows the small gap s formed between the body portions 22.

As shown in FIG. 11, the diffusion coating layer 26 is formed from the inner end 21b toward the outer side in the radial direction by a dimension n (m1<n<m2) in the radial direction. That is, the diffusion coating layer 26 is formed from the inner end 20b of the thin seal piece 52 up to a position, which overlaps the high-pressure side seal plate 16, and is formed so as to be included in the range that is exposed from the low-pressure side seal plate 17.

According to this structure, the diffusion coating layer 26 is formed on the surface of the thin seal piece 20. For this reason, the thickness of the thin seal piece 20 is not changed before and after diffusion coating. Accordingly, it is possible to improve wear resistance without changing the size of the small gap s.

Further, the diffusion coating layer 26 is formed from the inner end 20b of the thin seal piece 52 up to a position, which overlaps the high-pressure side seal plate 16, when seen in the axial direction, and is formed so as to be included in the range that is exposed from the low-pressure side seal plate 17. For this reason, the cementation layer 26 is not formed on the outer side of the thin seal piece in the radial direction, so that the change of the rigidity of the thin seal piece 20 becomes requisite minimum. Accordingly, it is possible to maintain the good elasticity of the thin seal piece 20.

Meanwhile, in the above-mentioned structure, the diffusion coating layer 26 is formed by a nitriding treatment. However, the diffusion coating layer may be formed by boronizing or the like.

Meanwhile, the shapes, combination, and the like of the respective members or operating procedures shown in the above-mentioned embodiments are illustrative, and may be changed in various ways on the basis of design requirements without departing from the scope of the invention.

For example, a case where the shaft seal mechanism 10 according to the invention is applied to the gas turbine 1 has been described in the above-mentioned embodiments. However, the shaft seal mechanism 10 according to the invention may be widely applied to, for example, general rotary machines, such as a steam turbine, a compressor, a waterwheel, a refrigerator, and a pump.

Further, in the above-mentioned embodiments, the plating treatment layer 25 and the diffusion coating layer 26 has been formed over the entire circumference of the cross-section of the thin seal piece 20 perpendicular to the axial direction of the thin seal piece 20. However, the plating treatment layer 25 and the diffusion coating layer 26 may be formed on at least one of the inner end portion 20b in the radial direction and the lower surface 20q, which faces the rotating shaft 5, of the portion of the thin seal piece 20 close to the inner end 21b.

Furthermore, the thin seal pieces 20 and 52 have been made of steel (for example, heat-resistant steel) in the above-mentioned embodiments, but may be made of other materials.

Moreover, the rotating shaft 5 has been made of steel (for example, heat-resistant steel) in the above-mentioned embodiments, but may be made of other materials.

INDUSTRIAL APPLICABILITY

According to the shaft seal device of the invention, it is possible to suppress the wear of a thin seal piece.

BRIEF DESCRIPTION OF THE REFERENCE SYMBOLS

1: gas turbine (rotary machine)
2: compressor (rotary machine)
4: turbine (rotary machine)
5: rotating shaft
11, 51: seal segment (shaft seal device)
12, 52: seal piece-laminated body
12b: small inner end face
12c, 12d: small side surface
16: high-pressure side seal plate
17: low-pressure side seal plate
20: thin seal piece
20a: outer end
20b: inner end
20c, 20d: side end portion
25: plating treatment layer (wear-resistant treatment layer)
26: diffusion coating layer (wear-resistant treatment layer)
s: small gap

The invention claimed is:

1. A shaft seal device comprising a seal piece-laminated body including a high-pressure side seal plate, a low-pressure side seal plate, and a plurality of thin seal pieces, wherein the plurality of thin seal pieces are laminated in a circumferential direction to be positioned along a periphery of a rotating shaft, outer ends of the plurality of thin seal pieces in a radial direction are connected to each other, inner ends of the plurality of thin seal pieces in the radial direction are formed as free ends, a small gap is formed between each adjacent pair of the plurality of thin seal pieces, and a small gap is formed between the rotating shaft and the seal piece-laminated body, wherein a wear-resistant treatment layer is formed on a surface of a portion of each of the thin seal pieces close to the inner end and a surface of another portion of each of the thin seal pieces is free of the wear-resistant treatment layer, wherein first side end portions of the thin seal pieces, which correspond to a width direction of the thin seal pieces and are close to the inner ends, form a first small side surface corresponding to a fluid high-pressure side in an axial direction, and second side end portions of the thin seal pieces, which correspond to the width direction of the thin seal pieces and are close to the inner ends, form a second small side surface corresponding to a low-pressure side in the axial direction, wherein the high-pressure side seal plate covers a portion of an outer side of the first small side surface in the radial direction and leaves an inner portion of the first small side surface in the radial direction exposed, wherein the low-pressure side seal plate covers a portion of an outer side of the second small side surface in the radial direction and leaves an inner portion of the second small side surface in the radial direction exposed, the inner portion of the second small side surface that is exposed being larger than the inner portion of the first small side surface that is exposed, wherein the wear-resistant treatment layer is formed on the surface of the portion of each of the thin seal pieces from the inner end up to a position that overlaps the high-pressure side seal plate and is free from overlap with the low-pressure side seal plate when viewed in the axial direction, and wherein the wear-resistant treatment layer is a plating treatment layer which has a thickness.

2. The shaft seal device according to claim 1, wherein the wear-resistant treatment layer is formed so as to be included in a range exposed from the low-pressure side seal plate when seen in the axial direction.

3. A rotary machine that includes the shaft seal devices according to claim 1 around the rotating shaft.

4. A rotary machine that includes the shaft seal devices according to claim 2 around the rotating shaft.

* * * * *